US011683604B1

(12) United States Patent
Zuo et al.

(10) Patent No.: US 11,683,604 B1
(45) Date of Patent: Jun. 20, 2023

(54) CIRCUIT AND METHOD FOR IMAGE ARTIFACT REDUCTION IN HIGH-DENSITY, HIGHPIXEL-COUNT, IMAGE SENSOR WITH PHASE DETECTION AUTOFOCUS

(71) Applicant: OmniVision Technologies, Inc., Santa Clara, CA (US)

(72) Inventors: Liang Zuo, Milpitas, CA (US); Rui Wang, San Jose, CA (US); Selcuk Sen, Mountain View, CA (US); Xuelian Liu, Sunnyvale, CA (US); Min Qu, Mountain View, CA (US); Hiroaki Ebihara, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/678,533

(22) Filed: Feb. 23, 2022

(51) Int. Cl.
*H04N 25/704* (2023.01)
*H04N 25/11* (2023.01)
*H04N 25/60* (2023.01)

(52) U.S. Cl.
CPC ........... *H04N 25/704* (2023.01); *H04N 25/11* (2023.01); *H04N 25/60* (2023.01)

(58) Field of Classification Search
CPC .. H04N 5/36961; H04N 9/0455; H04N 5/357; H04N 25/704; H04N 25/11; H04N 25/60
See application file for complete search history.

(56) References Cited

U.S. PATENT DOCUMENTS

| 11,438,571 | B2 * | 9/2022 | Saari | H04N 13/271 |
| 2018/0332276 | A1 * | 11/2018 | Hayashi | H04N 17/002 |
| 2019/0141299 | A1 * | 5/2019 | Siddiqui | H04N 5/2258 |
| 2020/0314361 | A1 * | 10/2020 | Kim | H04N 5/37457 |
| 2021/0337144 | A1 * | 10/2021 | Wang | H04N 5/36961 |
| 2021/0337169 | A1 * | 10/2021 | Chen | H01L 27/14612 |
| 2022/0109015 | A1 * | 4/2022 | Jung | H01L 27/1463 |

* cited by examiner

*Primary Examiner* — Shahbaz Nazrul
(74) *Attorney, Agent, or Firm* — Cozen O'Connor

(57) ABSTRACT

An image sensor includes an array of multiple-photodiode cells, each photodiode coupled through a selection transistor to a floating diffusion of the cell, the selection transistors controlled by respective transfer lines, a reset, a sense source follower, and a read transistor coupled from the source follower to a data line. The array includes phase detection rows with phase detection cells and normal cells; and a compensation row of more cells. In embodiments, each phase detection row has cells with at least one photodiode coupled to the floating diffusion by selection transistors controlled by a transfer line separate from transfer lines of selection transistors of adjacent normal cells of the row. In embodiments, the compensation row has cells with photodiodes coupled to the floating diffusion by selection transistors controlled by a transfer line separate from transfer lines of selection transistors of adjacent normal cells of the compensation row.

21 Claims, 4 Drawing Sheets

CIRCUIT AND METHOD FOR IMAGE ARTIFACT REDUCTION IN HIGH-DENSITY, HIGHPIXEL-COUNT, IMAGE SENSOR WITH PHASE DETECTION AUTOFOCUS

BACKGROUND

Applicants design high pixel count image sensors for the worldwide market. Some of these sensors have more than 100,000,000 photodiodes.

SUMMARY

An image sensor includes an array of multiple-photodiode cells, each photodiode coupled through a selection transistor to a floating diffusion of the cell, the selection transistors controlled by respective transfer lines, a reset, a sense source follower, and a read transistor coupled from the source follower to a data line. The array includes phase detection rows with phase detection cells and normal cells; and a compensation row of more cells. In embodiments, each phase detection row has cells with at least one photodiode coupled to the floating diffusion by selection transistors controlled by a transfer line separate from transfer lines of selection transistors of adjacent normal cells of the row. In embodiments, the compensation row has cells with photodiodes coupled to the floating diffusion by selection transistors controlled by a transfer line separate from transfer lines of selection transistors of adjacent normal cells of the compensation row.

DETAILED DESCRIPTION OF THE EMBODIMENTS

Figure 1:
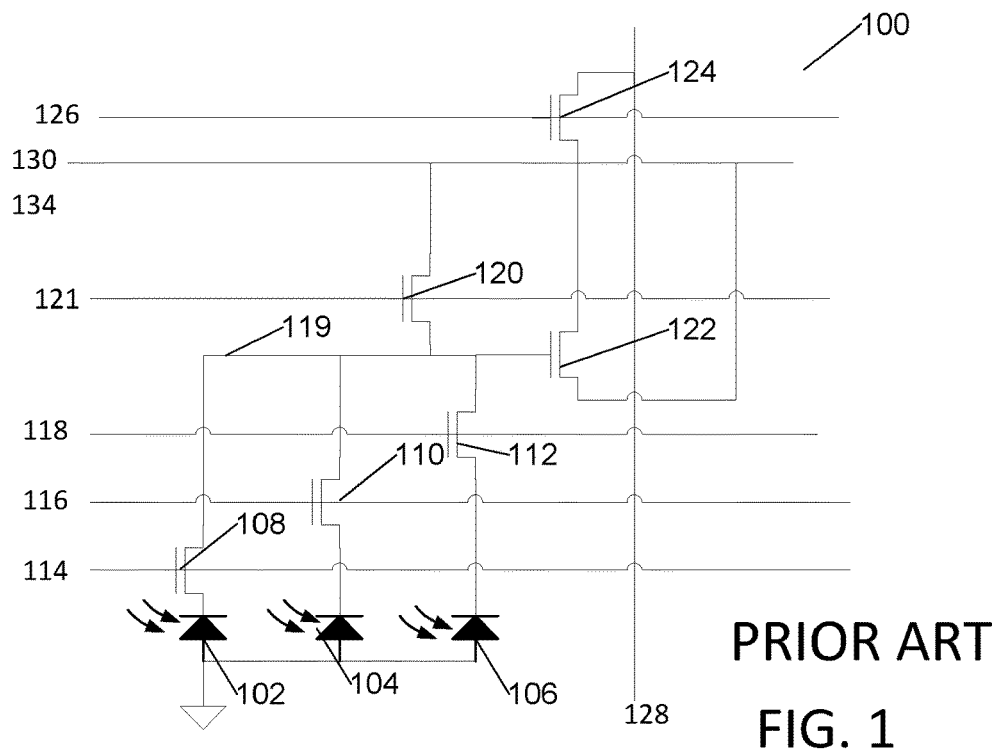
FIG. 1 is a schematic diagram of a group of photodiodes sharing common reset and sense transistors, as known in the art.

Each photodiode 102, 104, 106 of a standard multiple-photodiode cell 100 of many large-array image sensors, as illustrated in FIG. 1, has a selection transistor 108, 110, 112 having a gate coupled to a photodiode transfer line 114, 116, 118. Several, in the illustrated schematic three, of these selection transistors 108, 110, 112, drive a floating diffusion 119 and share a common reset transistor 120. Alternative embodiments may have different numbers of selection transistors driving the floating diffusion. Floating diffusion 119 is coupled to a gate of a common sense source-follower transistor 122. Reset transistor 120, controlled by reset line 121, couples floating diffusion 119 to an analog power 130 to clear floating diffusion 119 before reading each pixel and to precharge each photodiode at the start of each exposure. A source of common sense source-follower transistor 122 is coupled through a sense row select transistor 124 controlled by sense row select line 126 to a data line 128.

Many of these image sensors are adapted to using the "phase detection autofocus" (PDAF) scheme. In cameras using these image sensors with PDAF, we desire to perform imaging with a reduced number of pixels to conserve power while obtaining phase-detection images until autofocus is achieved, then perform imaging at full device resolution to capture an image in correct focus.

With such large photodiode counts in an image sensor array, differences in loads on data lines 128, or differences in resistance-capacitance (RC) delays along photodiode transfer lines 114, 116, 118, can cause image artifacts. Further, differences in transfer line voltages can also cause image artifacts.

In some large-photodiode-count image sensors, in order to reduce potential leakage in selection transistors 108, 110, 112, row selection lines such as photodiode transfer lines 114, 116 118, are driven between analog power and a negative voltage provided by an on-chip charge pump.

Figure 2:
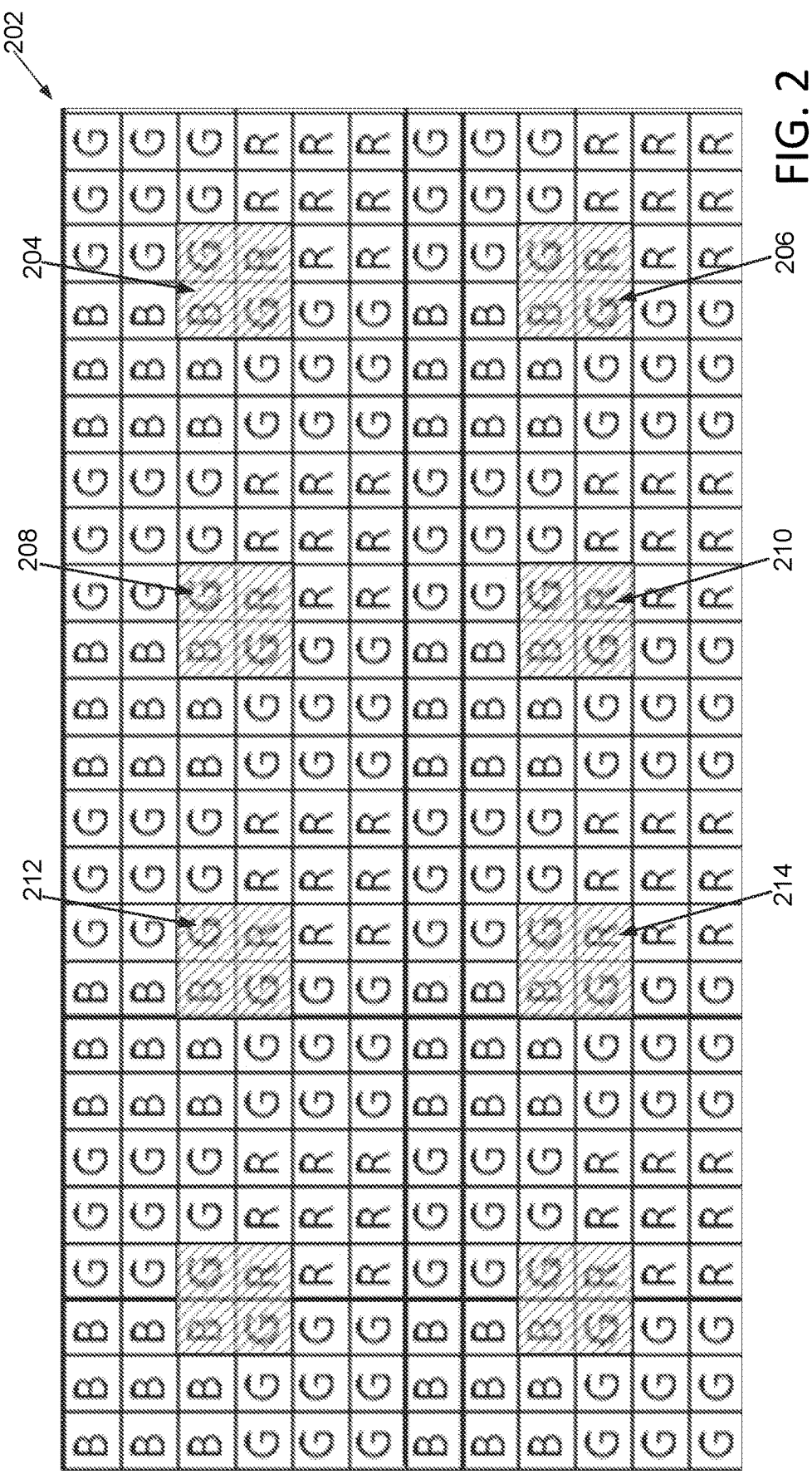
FIG. 2 illustrates color mask colors of a subset of photodiodes of an image sensor array, with highlighted 4-pixel groups of photodiodes that are read into thinned images for autofocus purposes.
Figure 6:
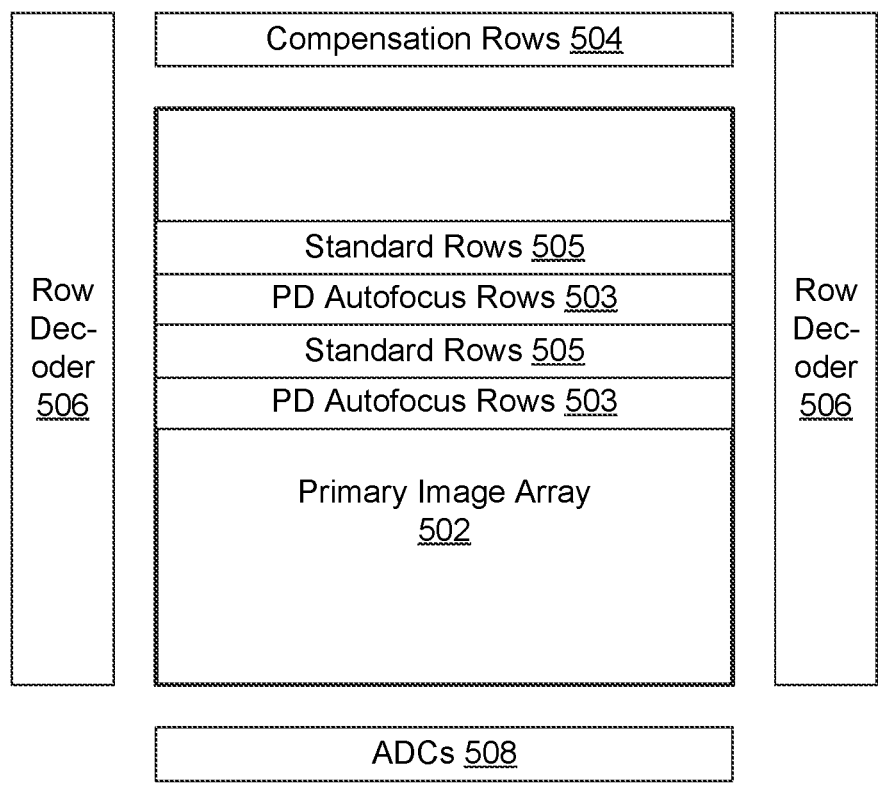
FIG. 6 is a schematic illustration of dummy lines added to the array to balance loads on phase detection transfer lines.

In an image sensor array, each photodiode has a color filter as illustrated by R for red, G for green, B for blue in the subset 202 illustrated in FIG. 2. For clarity, only photodiode color filters are shown, with transfer selection, sense, reset, and sense row select transistors omitted from FIGS. 2 and 4, and 6.

As the human eye responds to images with higher intensity resolution than color resolution, as common in electronic cameras since the 1953 introduction of NTSC color television, in particular embodiments of the image sensor higher resolution is provided for an intensity information than for color information. In the embodiment illustrated in FIG. 2, a red-green-green-blue (RGGB) Bayer-pattern is used and organized as a square pattern of four square groups, or quadrants, of photodiodes, with nine photodiodes in each square group or quadrant of photodiodes; each square group being organized as a rectangular block. In alternative embodiments, a modified Bayer pattern may be used such as an RGWB (VV being white) in place of the RGGB pattern illustrated; and in other alternative embodiments the square groups of photodiodes may include 1, 4, 9 (illustrated), 16, or 25 photodiodes each.

In an image sensor adapted for phase detect autofocus using thinned images each obtained using a subset of photodiodes of the array, it is desired to read pixels shown in gray shaded boxes 204, 206, 208, 210, 212, 214, in a subset 202 of the image sensor array, each gray shaded box containing one each of red and blue pixel, and two green pixels. To do so, a subset of photodiodes, including the photodiodes of each gray shaded box, along certain rows are selected using a different set of row lines, as illustrated in FIG. 3.

Figure 3:
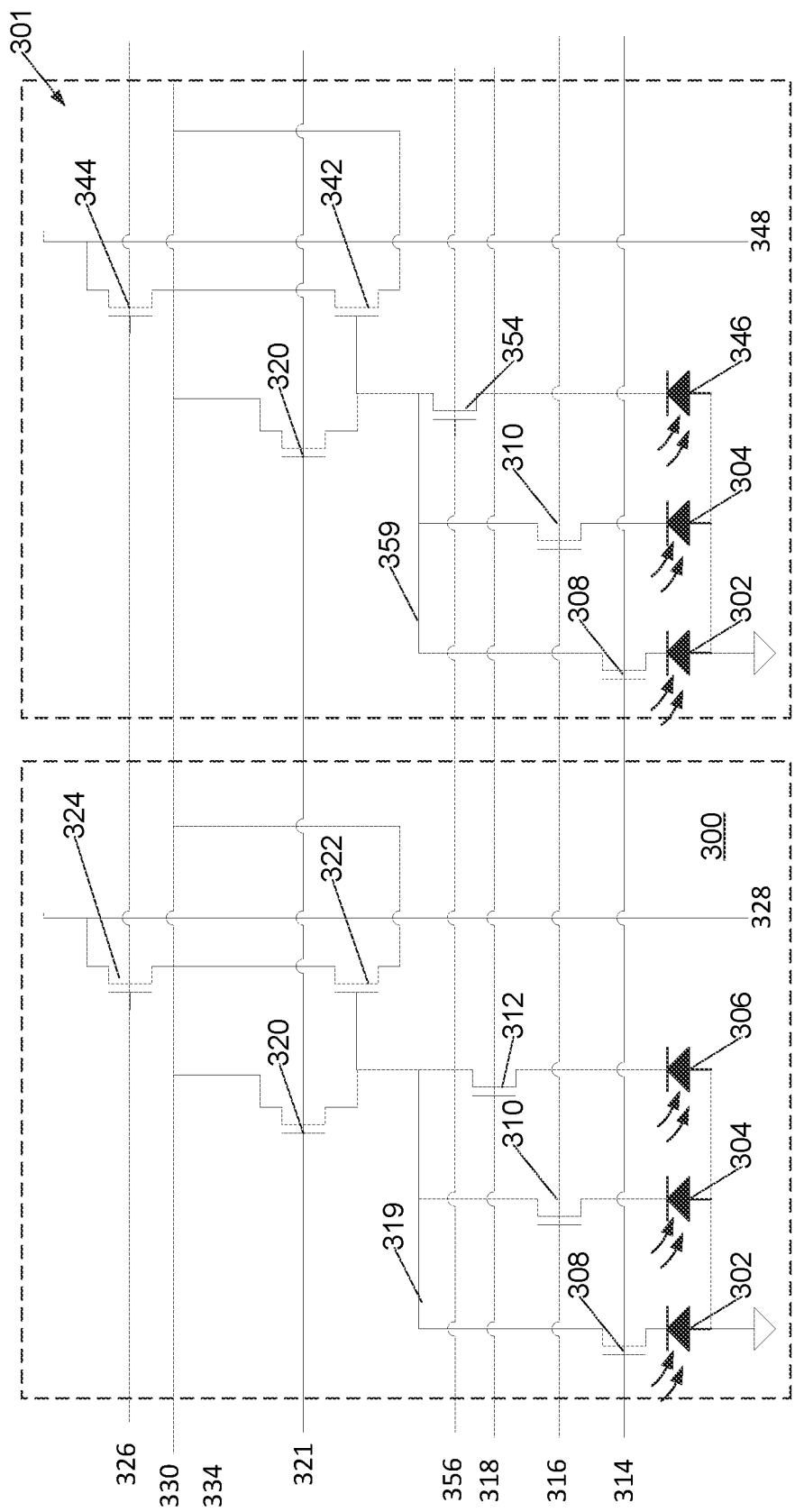
FIG. 3 is a schematic diagram of a pair of multiple-photodiode cells, each with common reset and sense transistors, where one photodiode of each cell is controlled by a separate transfer line.

Each photodiode 302, 304, 306 of a normal multiple-photodiode cell 300, in an embodiment tailored for use with phase detection autofocus as illustrated in FIG. 3, has an associated selection transistor 308, 310, 312 having a gate coupled to a photodiode transfer line 314, 316, 318. Several, in the illustrated schematic three of these selection transistors 308, 310, 312, drive a floating diffusion 319 and share a common reset transistor 320. Floating diffusion 319 is coupled to a gate of a common sense source-follower transistor 322. Reset transistor 320 couples floating diffusion 319 to an analog power 330 to clear floating diffusion 319 before reading each pixel and to precharge each photodiode at the start of each exposure. A drain of sense source-follower transistor 322 is coupled through a sense row select transistor 324 controlled by sense row select line 326 to a data line 328.

An adjacent, phase detection, cell 301 differs from normal multiple-photodiode cell 300 in that one photodiode 346 is coupled through a selection transistor 354 to floating diffusion 359 by a phase detection transfer line 356 different from the normal-cell-only photodiode transfer line 318 of normal multiple-photodiode cell 300. Floating diffusion 359 is coupled to a gate of grounded-source common sense source-follower transistor 342, common sense source-follower transistor's source is coupled through row select transistor 344 to data line 348. Other components of phase detection multiple-photodiode cell 301 having same reference numbers as in normal multiple-photodiode cell 300 have function similar to those in normal multiple-photodiode cell 300.

Figure 4:
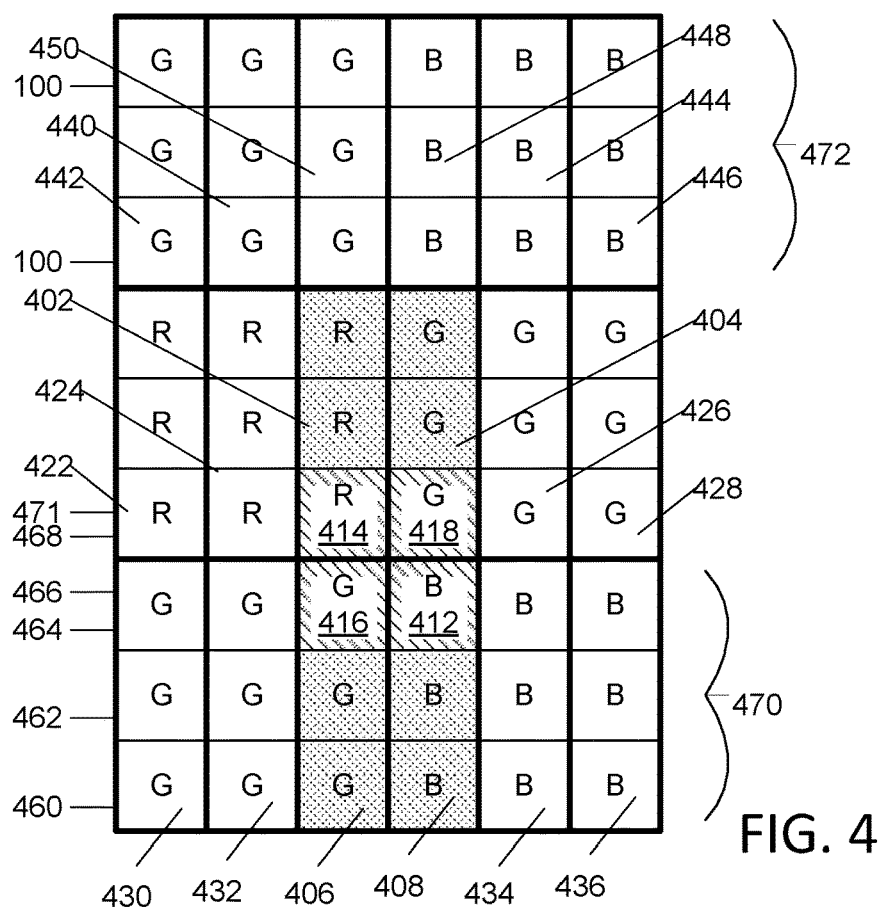
FIG. 4 is a schematic illustration of multiple-photodiode cells of the types illustrated in FIG. 3 are deployed in around each phase detection region.

Applying the normal multiple-photodiode cell 300 and phase-detection multiple photodiode cell 301 (FIG. 3) into a layout according to FIG. 2 gives a photodiode and cell pattern according to FIG. 4, where groups of four phase-detection multiple-photodiode cells 402, 404, 406, 408 are arranged such that the one photodiode 346 controlled by phase detection transfer lines 356 of each phase-detection multiple-photodiode cell 402, 404, 406, 408 is positioned adjacent three other photodiodes 346 controlled by phase detection transfer lines 356 of phase detection multiple-photodiode cells 402, 404, 406, 408 to give a four-photodiode Bayer-pattern of adjacent phase-detection photodiodes 412, 414, 416, 418. In the embodiment illustrated, an R-G-G-B pattern is illustrated, however in other image sensors a modified Bayer-pattern such as an R-G-W-B or a C (cyan)-Y (yellow)-Y-M (magenta) color-filter pattern may be used. Each group of four phase-detection multiple-photodiode cells 301, 402, 404, 406, 408 may be separated by one or more 422, 424, 426, 428, 430, 432, 434, 436 normal multiple-photodiode cells 300 in each phase detection row 470, and rows containing phase-detection cells 301 may be separated by standard rows 472 containing only standard multiple-photodiode cells 100, 440, 442, 444, 446, 448, and 450.

The disclosed image sensor permits reading of thinned images for phase-detection autofocus purposes while conserving power by not reading photodiode rows not having phase-detection photodiodes and by not using, and thus not requiring sensing or re-precharging of, data lines 328 not associated with phase-detection photodiodes of phase detection rows 470.

The layout as heretofore described, however, provides three groups of transfer lines with different capacitive loadings because they couple to different counts of selection transistors. These include a first group of fully-loaded transfer lines such as 314, 316, 460, 462 that couple to transfer transistors in normal multiple-photodiode cells 300 and phase-detection multiple-photodiode cells 301, along with photodiode transfer lines 114, 116, 118 of standard multiple-photodiode cells, a second group of intermediate-loaded transfer lines such as photodiode transfer line 318, 464, 468 that couple to transfer transistors in normal multiple-photodiode cells 300, and a third group of lightly-loaded transfer lines such as phase-detection transfer lines 356, 466, 471 that couple to transfer transistors only in phase detection multiple-photodiode cells 301.

It should be noted that, during reading of phase-detection thinned images, only the third group of transfer lines are used, while during reading of normal images all three groups of transfer lines are used. Further, while reading both types of images, only one transfer line is used between each pulse of the reset line to allow individual rows of photodiodes to be read onto the data lines.

Figure 5:
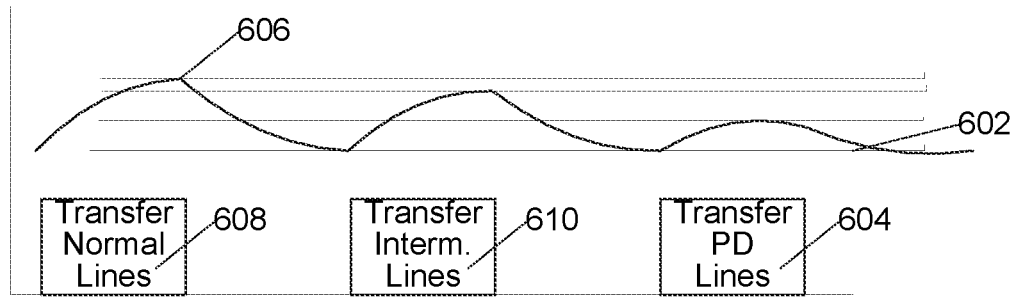
FIG. 5 illustrates voltage changes on the negative charge pump output due to switching transients on transfer lines.

The differences in loading on the first, second, and third groups of transfer lines can result in two phenomena:

a) a faster signal propagation along the third group of transfer lines than along the first group of transfer lines because of reduced resistance-capacitance (RC) delay, and b) because transfer lines of the third group are more lightly loaded, when they switch a smaller change in voltage 602 (FIG. 5) provided by the on-chip charge-pump occurs when the third group of transfer lines are pulsed 604 than a change in voltage 606 when lines of the first 608 or second 610 group are pulsed. Since this change in voltage is coupled through drivers onto negative transfer lines and through parasitic capacitances of selection transistors onto floating diffusions 359, 319, 119, it can cause a slight disturbance in photodiode readings as they are coupled onto data lines.

The combination of these two effects can cause a visible horizontal artifact in full image captured with the image sensor.

To prevent the visible horizontal artifact, we introduce at least one, and in a particular embodiment 72, compensation rows 504 (FIG. 6) disposed adjacent the active array 502 of the image sensor that incorporates multiple standard rows 505 and PD autofocus rows 503 as heretofore described. Each compensation row has dummy photodiodes with selection transistors equivalent to those of a phase detection row. An intermediate-load transfer line of a compensation row, equivalent to an intermediate-load photodiode transfer line 318 of a phase-detection row, is activated each time a lightly loaded phase-detection transfer line 356 of a phase-detection row is activated. Similarly, a lightly loaded phase-detection transfer line 356 of a compensation row, equivalent to a lightly loaded phase-detection transfer line 356 of a phase-detection row, is activated each time an intermediate-load normal-cell transfer line 318 of a phase-detection row is activated. A blank line of a compensation row that couples to no selection transistors is activated each time a regular transfer line of a phase detection row 470 or of a standard row 472 is activated. In this way, capacitive loads coupled onto the charge pump are matched for each activation of a transfer line, thereby producing the voltage change of the first 608 group.

Compensation rows 504 are coupled to data lines 328, 348 of the active array 502 but their row sense selection lines 326 are never activated.

Since using the compensation rows in this way matches disturbances on the negative voltage 602 the on-chip charge-pump produces, visible horizontal artifacts in images captured with the image sensor due to phenomena (b) above are cancelled, leaving cleaner images than those obtained without using compensation rows in similar manner.

In order to match propagation delay and suppress artifacts due to phenomena (a) above, transfer lines of the first, second, and third group are driven from both ends by duplicate row decoders 506.

In embodiments, the multiple-photodiode cells may have other numbers of photodiodes than illustrated in FIGS. 1, 3, and discussed herein.

Combinations

The system described herein may be implemented in a variety of ways. Among combinations that inventors anticipate are the combinations below:

An image sensor designated A includes an array comprising multiple multiple-photodiode cells, each multiple photodiode cell having multiple photodiodes, each photodiode coupled through a selection transistor to a floating diffusion of the multiple-photodiode cell, the selection transistors controlled by respective photodiode transfer lines, a reset transistor coupled to the floating diffusion of the multiple-photodiode cell, a sense source follower controlled by the floating diffusion of the multiple-photodiode cell, and a read transistor coupled from the sense source follower to a data line. The array includes at least one phase detection row with phase detection multiple-photodiode cells of the multiple multiple-photodiode cells and normal multiple-photodiode cells of the multiple multiple-photodiode cells; and at least one compensation row comprising multiple photodiode cells of the multiple-photodiode cells.

An image sensor designated AA including the image sensor designated A wherein each of the at least one phase detection row has at least one multiple-photodiode cell with at least one photodiode coupled to the floating diffusion of the phase detection multiple-photodiode cell by a selection transistor controlled by a photodiode transfer line separate from photodiode transfer lines coupled to selection transistors of adjacent normal multiple-photodiode cells of the phase detection row.

An image sensor designated AB including the image sensor designated A or AA wherein the array further comprises standard rows comprising standard multiple-photodiode cells of the multiple-photodiode cells.

An image sensor designated ABA including the image sensor designated AB wherein each standard multiple-photodiode cell of each standard row has selection transistors coupled to same photodiode transfer lines as adjacent standard multiple-photodiode cells of the same standard row.

An image sensor designated AC including the image sensor designated A, AA, AB, or ABA wherein the at least one compensation row comprises at least one multiple-photodiode cell comprising at least one photodiode coupled to the floating diffusion of the multiple photodiode cell by a selection transistor controlled by a photodiode transfer line separate from photodiode transfer lines coupled to selection transistors of adjacent normal multiple-photodiode cells of the compensation row.

An image sensor designated ACA including the image sensor designated AC wherein the at least one compensation row further comprises at least one photodiode transfer line not coupled to selection transistors.

An image sensor designated AD including the image sensor designated A, AA, AB, ABA, AC, or ACA where each multiple photodiode cell comprises 2, 3, or 4 photodiodes.

An image sensor designated ADA including the image sensor designated AD, where each multiple photodiode cell comprises 3 photodiodes.

An image sensor designated AE including the image sensor designated A, AA, AB, ABA, AC, ACA, AD, or ADA further comprising color filters organized in a modified red-green-green-blue (RGGB) Bayer pattern with 4, 9, or 16 photodiodes in a rectangular block associated with each quadrant of the RGGB pattern.

An image sensor designated AEA including the image sensor designated AE wherein each quadrant of the RGGB pattern has 9 photodiodes.

An image sensor designated AEB including the image sensor AE or AEA wherein two phase-detection rows are adjacent, and two phase detection cells in each phase-detection rows are adjacent, disposed so phase-detection photodiodes of the phase detection cells are adjacent, giving a four-photodiode RGGB Bayer-pattern of adjacent phase-detection photodiodes.

An image sensor designated AF including the image sensor designated A, AA, AB, ABA, AC, ACA, AD, or ADA further comprising color filters organized in a modified red-green-green-blue (RGWB) Bayer pattern with 4, 9, or 16 photodiodes in a rectangular block associated with each quadrant of the RGWB pattern.

An image sensor designated AFA including the image sensor designated AF wherein each quadrant of the RGWB pattern has 9 photodiodes.

An image sensor designated AFB including the image sensor designated AF or AFA wherein two phase-detection rows are adjacent, and two phase detection cells in each phase-detection rows are adjacent, disposed so phase-detection photodiodes of the phase detection cells are adjacent, giving a four-photodiode RGWB Bayer-pattern of adjacent phase-detection photodiodes.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An image sensor comprising:
    an array comprising a plurality of multiple-photodiode cells, each multiple-photodiode cell comprising:
    a plurality of photodiodes, each photodiode coupled through a selection transistor to a floating diffusion of the multiple-photodiode cell,
    the selection transistors controlled by respective photodiode transfer lines,
    a reset transistor coupled to the floating diffusion of the multiple-photodiode cell,
        a sense source follower controlled by the floating diffusion of the multiple-photodiode cell, and
        a read transistor coupled from the sense source follower to a data line;
    the array comprising at least one phase detection row comprising phase detection multiple-photodiode cells of the plurality of multiple-photodiode cells and normal multiple-photodiode cells of the plurality of multiple-photodiode cells; and
    at least one compensation row comprising a plurality of dummy multiple photodiode cells of the plurality of multiple-photodiode cells;
    the at least one compensation row configured so its row sense select line cannot be activated.

2. The image sensor of claim 1 wherein each of the at least one phase detection row comprises at least one multiple-photodiode cell comprising at least one photodiode coupled to the floating diffusion of the phase detection multiple-photodiode cell by a selection transistor controlled by a photodiode transfer line separate from photodiode transfer lines coupled to selection transistors of adjacent normal multiple-photodiode cells of the phase detection row.

3. The image sensor of claim 2 wherein the array further comprises standard rows comprising standard multiple-photodiode cells of the plurality of multiple-photodiode cells.

4. The image sensor of claim 3 wherein each standard multiple-photodiode cell of each standard row has selection transistors coupled to same photodiode transfer lines as adjacent standard multiple-photodiode cells of the same standard row.

5. An image sensor comprising:
an array comprising a plurality of multiple-photodiode cells, each multiple-photodiode cell comprising:
a plurality of photodiodes, each photodiode coupled through a selection transistor to a floating diffusion of the multiple-photodiode cell,
the selection transistors controlled by respective photodiode transfer lines,
a reset transistor coupled to the floating diffusion of the multiple-photodiode cell,
a sense source follower controlled by the floating diffusion of the multiple-photodiode cell, and
a read transistor coupled from the sense source follower to a data line;
the array comprising at least one phase detection row comprising phase detection multiple-photodiode cells of the plurality of multiple-photodiode cells and normal multiple-photodiode cells of the plurality of multiple-photodiode cells; and
at least one compensation row comprising a plurality of dummy multiple photodiode cells of the plurality of multiple-photodiode cells;
wherein the at least one compensation row comprises at least one multiple-photodiode cell comprising at least one photodiode coupled to the floating diffusion of the multiple photodiode cell by a selection transistor controlled by a photodiode transfer line separate from photodiode transfer lines coupled to selection transistors of adjacent normal multiple-photodiode cells of the compensation row.

6. The image sensor of claim 5 wherein the at least one compensation row further comprises at least one photodiode transfer line not coupled to selection transistors.

7. The image sensor of claim 1 where each multiple photodiode cell comprises 2, 3, or 4 photodiodes.

8. The image sensor of claim 7 where each multiple photodiode cell comprises 3 photodiodes.

9. The image sensor of claim 1 further comprising color filters organized in a modified red-green-green-blue (RGGB) Bayer pattern with 4, 9, or 16 photodiodes in a rectangular block associated with each quadrant of the RGGB pattern.

10. The image sensor of claim 9 wherein each quadrant of the RGGB pattern has 9 photodiodes.

11. The image sensor of claim 9 wherein two phase-detection rows are adjacent, and two phase detection cells in each phase-detection rows are adjacent, disposed so phase-detection photodiodes of the phase detection cells are adjacent, giving a four-photodiode RGGB Bayer-pattern of adjacent phase-detection photodiodes.

12. The image sensor of claim 1 further comprising color filters organized in a modified red-green-white-blue (RGWB) Bayer pattern with 4, 9, or 16 photodiodes in a rectangular block associated with each quadrant of the RGWB pattern.

13. An image sensor comprising:
an array comprising a plurality of multiple-photodiode cells, each multiple-photodiode cell comprising:
a plurality of photodiodes, each photodiode coupled through a selection transistor to a floating diffusion of the multiple-photodiode cell,
the selection transistors controlled by respective photodiode transfer lines,
a reset transistor coupled to the floating diffusion of the multiple-photodiode cell,
a sense source follower controlled by the floating diffusion of the multiple-photodiode cell, and
a read transistor coupled from the sense source follower to a data line;
the array comprising at least one phase detection row comprising phase detection multiple-photodiode cells of the plurality of multiple-photodiode cells and normal multiple-photodiode cells of the plurality of multiple-photodiode cells;
at least one compensation row comprising a plurality of dummy multiple photodiode cells of the plurality of multiple-photodiode cells;
color filters organized in a modified red-green-white-blue (RGWB) Bayer pattern with 9 photodiodes in a rectangular block in each quadrant of the RGWB pattern.

14. The image sensor of claim 13 wherein two phase-detection rows are adjacent, and two phase detection cells in each phase-detection rows are adjacent, disposed so phase-detection photodiodes of the phase detection cells are adjacent, giving a four-photodiode RGWB Bayer-pattern of adjacent phase-detection photodiodes.

15. The image sensor of claim 11 wherein each of the phase detection rows comprises at least one multiple-photodiode cell comprising at least one photodiode coupled to the floating diffusion of the phase detection multiple-photodiode cell by a selection transistor controlled by a photodiode transfer line separate from photodiode transfer lines coupled to selection transistors of adjacent normal multiple-photodiode cells of the phase detection row.

16. The image sensor of claim 15 wherein the array further comprises standard rows comprising standard multiple-photodiode cells of the plurality of multiple-photodiode cells.

17. The image sensor of claim 16 wherein each standard multiple-photodiode cell of each standard row has selection transistors coupled to same photodiode transfer lines as adjacent standard multiple-photodiode cells of the same standard row.

18. The image sensor of claim 17 wherein the at least one compensation row comprises at least one multiple-photodiode cell comprising at least one photodiode coupled to the floating diffusion of the multiple photodiode cell by a selection transistor controlled by a photodiode transfer line separate from photodiode transfer lines coupled to selection transistors of adjacent normal multiple-photodiode cells of the compensation row.

19. The image sensor of claim 18 where each multiple photodiode cell comprises 2, 3, or 4 photodiodes.

20. The image sensor of claim 19 where each multiple photodiode cell comprises 3 photodiodes.

21. The image sensor of claim 1 wherein the at least one compensation row is located adjacent to, but outside, a primary image area of the array comprising a plurality of multiple-photodiode cells.

* * * * *